(12) United States Patent
Soeno et al.

(10) Patent No.: US 6,744,603 B1
(45) Date of Patent: Jun. 1, 2004

(54) WRITE/READ HEAD SUPPORTING MECHANISM, AND WRITE/READ SYSTEM

(75) Inventors: Yoshikazu Soeno, Tokyo (JP); Takamitsu Tsuna, Tokyo (JP); Shinji Ichikawa, Tokyo (JP); Masashi Shiraishi, Tokyo (JP); Takeshi Wada, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/615,715

(22) Filed: Jul. 13, 2000

Related U.S. Application Data

(63) Continuation of application No. PCT/JP99/06326, filed on Nov. 12, 1999.

(30) Foreign Application Priority Data

Nov. 13, 1998 (JP) .......................... 10-341131
Jul. 14, 1999 (JP) .......................... 11-200358

(51) Int. Cl.$^7$ ................................. G11B 5/48
(52) U.S. Cl. .................................. 360/245.6
(58) Field of Search ................ 360/245.1–245.6, 360/244, 323, 294.4

(56) References Cited

U.S. PATENT DOCUMENTS

| | | | | |
|---|---|---|---|---|
| 5,282,103 A | * | 1/1994 | Hatch et al. | 360/245.5 |
| 5,331,489 A | * | 7/1994 | Johnson et al. | 360/245.6 |
| 5,657,186 A | | 8/1997 | Kudo et al. | |
| 5,745,319 A | | 4/1998 | Takekado et al. | |
| 5,805,381 A | * | 9/1998 | Resh | 360/245.5 |
| 5,818,662 A | * | 10/1998 | Shum | 360/245.5 |
| 5,850,320 A | * | 12/1998 | Warmka et al. | 360/245.5 |
| 5,859,749 A | * | 1/1999 | Zarouri et al. | 360/245.9 |
| 5,880,908 A | * | 3/1999 | Shiraishi et al. | 360/245.3 |
| 5,896,248 A | * | 4/1999 | Hanrahan et al. | 360/245.3 |

(List continued on next page.)

FOREIGN PATENT DOCUMENTS

| | | |
|---|---|---|
| JP | 53-69623 | 6/1978 |
| JP | 61-153117 | 9/1986 |
| JP | 2-31389 | 2/1990 |
| JP | 3-95717 | 4/1991 |
| JP | 6-259905 | 9/1994 |
| JP | 6-309822 | 11/1994 |
| JP | 8-180623 | 7/1996 |
| JP | 10-11923 | 1/1998 |
| WO | WO 98/19304 | 5/1998 |

OTHER PUBLICATIONS

U.S. patent application Ser. No. 09/615,715, Soeno et al., filed Jul. 13, 2000.

U.S. patent application Ser. No. 10/631,860 Ichikawa et al., filed Aug. 1, 2003.

U.S. patent application Ser. No. 09/615,715, filed Jul. 13, 2000, pending.

U.S. patent application Ser. No. 10/153,901 filed May 24, 2002, pending.

*Primary Examiner*—Allen Cao
(74) *Attorney, Agent, or Firm*—Oblon, Spivak, McClelland, Maier & Neustadt, P.C.

(57) ABSTRACT

The object of the present invention is to provide a write/read head supporting mechanism for a magnetic or optical disk system having a micro-displacement actuator, by which any impediment to the displacement capability of the actuator is eliminated. A write/read head supporting mechanism comprises a slider provided with an electromagnetic transducer element or an optical module, and a suspension. The slider is supported on suspension by way of an actuator for displacing slider. An electrical connection to the electromagnetic transducer element or said optical module is made by a first interconnecting arrangement movable and/or deformable in the displacement direction of slider by actuator, and an electrical connection to actuator is made by a second interconnecting arrangement.

14 Claims, 7 Drawing Sheets

U.S. PATENT DOCUMENTS

| | | | | |
|---|---|---|---|---|
| 5,956,209 A | * | 9/1999 | Shum | 360/245.5 |
| 6,147,840 A | * | 11/2000 | Khan | 360/245.5 |
| 6,233,127 B1 | * | 5/2001 | Shimazawa | 360/323 |
| 6,239,947 B1 | * | 5/2001 | Fan et al. | |
| 6,246,552 B1 | * | 6/2001 | Soeno et al. | 360/294.4 |
| 6,266,213 B1 | * | 7/2001 | Hiraoka | 360/244.1 |
| 6,381,104 B1 | * | 4/2002 | Soeno et al. | 360/294.4 |
| 6,388,840 B1 | * | 5/2002 | Ohwe | 360/244.1 |
| 6,437,944 B2 | * | 8/2002 | Ohwe et al. | 360/244.1 |
| 6,459,548 B1 | * | 10/2002 | Shiraishi et al. | 360/245.9 |
| 6,483,671 B2 | * | 11/2002 | Vigna et al. | 360/294.5 |
| 6,501,623 B1 | * | 12/2002 | Sassolini et al. | 360/245.3 |
| 6,587,313 B2 | * | 7/2003 | Kurihara et al. | 360/294.4 |
| 6,621,661 B1 | * | 9/2003 | Ichikawa et al. | 360/234.5 |

* cited by examiner

WRITE/READ HEAD SUPPORTING MECHANISM, AND WRITE/READ SYSTEM

This application is a continuation of PCT/JP99/06326, filed Nov. 12, 1999.

FIELD OF THE INVENTION

The present invention relates to a write/read head supporting mechanism for write/read systems such as hard disk drives (hereinafter HDDs for short) or optical disk drives, and a write/read system comprising such a write/read head supporting mechanism.

BACKGROUND OF THE INVENTION

A prior art magnetic head supporting mechanism used with HDDs is generally built up of a slider having an electromagnetic transducer element, a suspension for supporting the slider, and an interconnecting pattern connected to the electromagnetic transducer element.

The electromagnetic transducer element comprises a magnetic pole and coil for converting electric signals to magnetic signals, and vice versa, a magnetoresistance effect element for transforming magnetic signals to voltage signals, and so on, each being fabricated by thin-film techniques, assembly techniques, etc. The slider is formed of non-magnetic ceramics such as $Al_2O_3$—TiC or $CaTiO_3$ or a magnetic material such as ferrite, and has a generally cuboidal shape. The surface (air bearing surface) of the slider opposite to a disk medium is processed into a shape suitable for generating pressure to fly the slider on the disk medium at a small spacing.

The suspension for supporting the magnetic head is formed by bending, punching or otherwise processing a resilient stainless sheet.

Proposed for the interconnecting pattern are an arrangement where, as typically set forth in JU-A 61-153117, an interconnecting wire formed on the suspension is connected to the electromagnetic transducer element by way of a lead wire, and an arrangement where all interconnecting wires are brought in close contact with the surface of the suspension.

On the other hand, a HDD is increasingly required to be downsized with ever-higher recording density and, hence, have ever-higher track density and ever-narrower track width. To improve tracking precision in a high-density recording HDD, it is effective to provide the magnetic head with an actuator for effecting a micro-displacement of the electromagnetic transducer element or slider with respect to the suspension. Such an actuator, for instance, is disclosed in JP-A's 6-259905, 6-309822 and 8-180623.

SUMMARY OF THE INVENTION

A problem with the magnetic head having an actuator is that interconnecting wires for connecting the suspension side to the electromagnetic transducer element are likely to provide an impediment to the relative displacement of the slider with respect to the suspension, which occurs when the slider is driven by the actuator.

However, the above publications disclosing the provision of the actuator say nothing about the interconnecting wires for connecting the suspension side to the electromagnetic transducer element. In other words or as a matter of course, the influence the interconnecting wires have on the displacement capability of the actuator is not taken into consideration.

An object of the present invention is to provide a write/read head supporting mechanism for a magnetic or optical disk system having a micro-displacement actuator, by which any impediment to the displacement capability of the actuator is eliminated.

Such an object is achievable by the constructions of the invention defined below as (1) to (11).

(1) A write/read head supporting mechanism comprising a slider provided with an electromagnetic transducer element or an optical module, and a suspension, wherein said slider is supported on said suspension by way of an actuator for displacing said slider, an electrical connection to said electromagnetic transducer element or said optical module is made by a first interconnecting arrangement movable and/or deformable in a displacement direction of said slider by said actuator, and an electrical connection to said actuator is made by a second interconnecting arrangement.

(2) The write/read head supporting mechanism according to (1) above, wherein said first interconnecting arrangement includes a lead wire floating away from a surface of said suspension.

(3) The write/read head supporting mechanism according to (2) above, wherein said lead wire floating away form the surface of said suspension is a bonding wire.

(4) The write/read head supporting mechanism according to (1) above, wherein said first interconnecting arrangement includes a flexible printed wire.

(5) The write/read head supporting mechanism according to (1) above, wherein said first interconnecting arrangement is formed by bringing wires in close contact with a surface of said suspension, and then removing a part of said suspension so that a part of said wires in close contact with the surface of said suspension is placed in a floating state.

(6) The write/read head supporting mechanism according to (1) above, wherein said first interconnecting arrangement is formed on a surface of said suspension while said first interconnecting arrangement is in close contact therewith, and allowing an area of low rigidity to exist at a part of said suspension, so that said first interconnecting arrangement is movable and/or deformable in the displacement direction of said slider by said actuator.

(7) The write/read head supporting mechanism according to any one of (1) to (6) above, wherein at least one part of said first interconnecting arrangement and at least one part of said second interconnecting arrangement are unable to exist on the same surface of said suspension.

(8) The write/read head supporting mechanism according to any one of (1) to (7) above, wherein said actuator makes use of an inverse piezoelectric effect or an electrostrictive effect.

(9) The write/read head supporting mechanism according to any one of (1) to (8) above, wherein a head driving IC chip is built on said suspension.

(10) The write/read head supporting mechanism according to any one of (1) to (9) above, which includes a main actuator for driving said suspension.

(11) A write/read system which comprises a write/read head supporting mechanism as recited in any one of (1) to (10) above.

PREFERRED EMBODIMENTS OF THE INVENTION

The write/read head supporting mechanism according to the invention comprises a slider provided with an electromagnetic transducer element or an optical module, and a suspension on which the slider is mounted while an actuator for displacing the slider is located between them The present invention will now be explained with reference to a magnetic head with an electromagnetic transducer element mounted on a slider.

First of all, typical constructions of the suspension, actuator and slider are explained.

Figure 10:
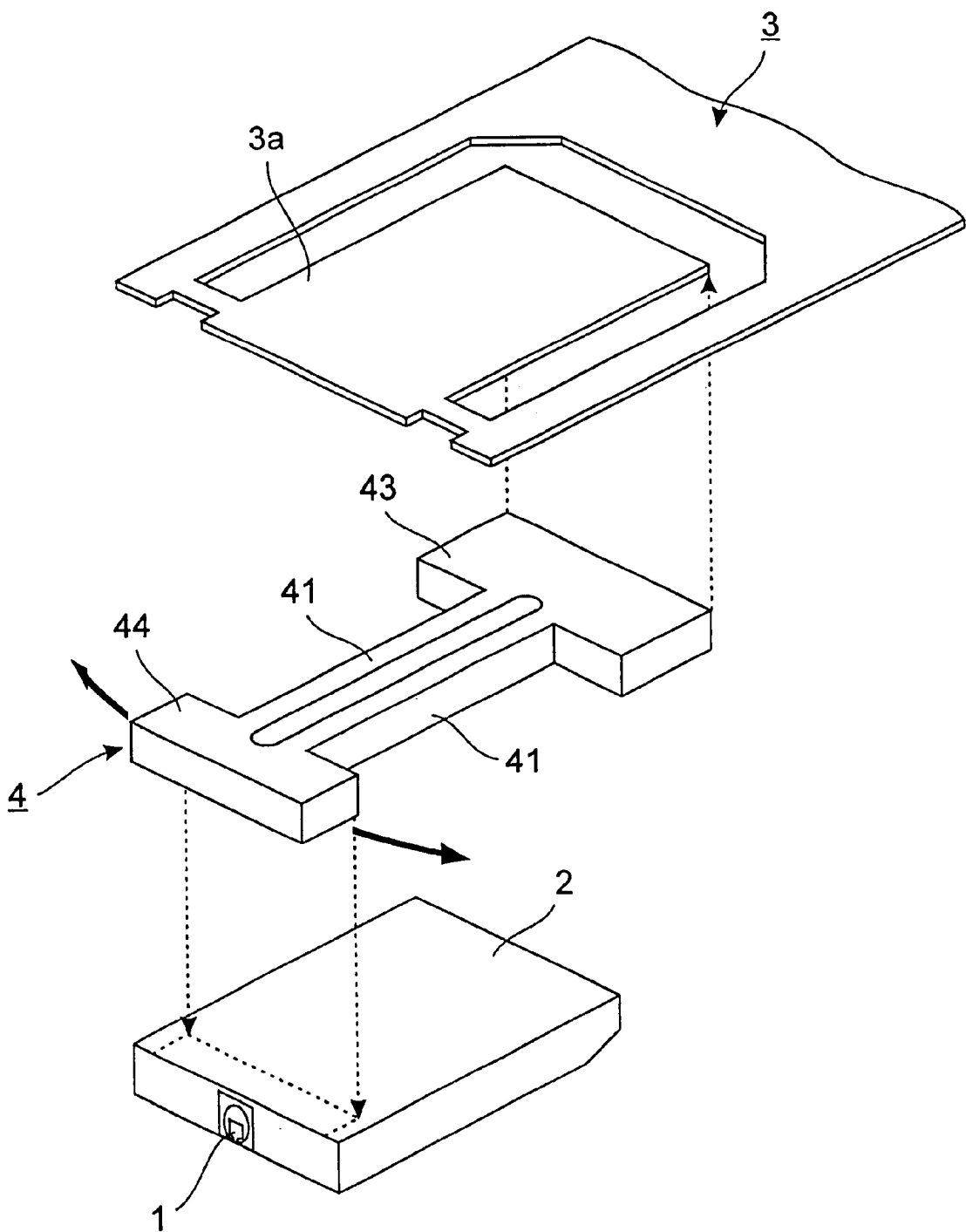
FIG. 10 is an exploded perspective view of one exemplary construction of the magnetic head supporting mechanism.

FIG. 10 is an exploded perspective view of one exemplary construction of the magnetic head supporting mechanism including an actuator. This magnetic head supporting mechanism is built up of a slider 2 provided with an electromagnetic transducer element 1 and a suspension 3 for supporting the slider 2, with an actuator 4 located between the slider 2 and the suspension 3.

The actuator 4 is to effect a micro-displacement of the slider 2 with respect to the suspension 3, and is fixed as by bonding to a gimbal block 3a located at an end portion of the suspension 3. The gimbal block 3a is formed by providing grooves in the suspension member by etching, punching or the like for the purpose of allowing the slider to follow a disk medium surface. It is here noted that the magnetic head is provided with a main actuator for driving the whole of the suspension.

The actuator 4 comprises a fixed part 43 and a movable part 44, and further includes two rod-like displacement generating means 41 and 41. Each of the displacement generating means 41 is provided with at least one piezoelectric or electrostrictive material layer having electrode layers on both sides, and constructed such that it elongates and contracts upon the application of voltage on the electrode layers. The piezoelectric or electrostrictive material layer is formed of a piezoelectric or electrostrictive material that elongates and contracts by inverse piezoelectric effect or electrostrictive effect. One end of the displacement generating means 41 is coupled to the suspension via the fixed part 43, and the other end of the displacement generating means 41 is coupled to the slider via the movable part 44. Upon the elongation and contraction of the displacement generating means 41, the slider is so displaced that the electromagnetic transducer element is displaced circularly. This in turn causes the electromagnetic transducer element to cross over recording tracks on a disk medium.

When the piezoelectric or electrostrictive material layer sandwiched between the electrode layers in the displacement generating means 41 of the actuator 4 is constructed of a so-called piezoelectric material such as PZT, the piezoelectric or electrostrictive material layer is usually subjected to a polarizing treatment so as to improve its displacement capability. The direction of polarization by this polarization treatment is a thickness-wise direction of the actuator. When the direction of an electric field upon the application of voltage on the electrode layers is in alignment with the direction of polarization, the piezoelectric or electrostrictive material layer between both electrode layers elongates in its thickness-wise direction (piezoelectric longitudinal effect), and contracts in its plane direction (piezoelectric transverse effect). When the direction of the electric field is reverse to the direction of polarization, on the other hand, the piezoelectric or electrostrictive material layer contracts in its thickness-wise direction (piezoelectric longitudinal effect), and elongates in its plane direction (piezoelectric transverse effect). When contraction-inducing voltage is applied alternately on one displacement generating means and another displacement generating means, the length ratio between one displacement generating means and another displacement generating means changes so that both displacement generating means deflect in the same direction in the plane of the actuator. By this deflection, the movable part 44 rolls and pitches with respect to the fixed part 43 in a direction indicated by arrows in FIG. 10, with the center of the roll-and-pitch motion defined by the position of the movable part 44 in the absence of voltage. This roll-and-pitch motion allows the movable part 44 to displace circularly in a direction substantially perpendicular to the direction of elongation and contraction of the displacement generating means 41, with the direction of the roll-and-pitch motion lying within the plane of the actuator. Thus, the electromagnetic transducer element, too, rolls and pitches in a circular orbit. At this time, there is no fear of attenuation of polarization because the direction of voltage is in alignment with that of polarization. It is noted that even when both the displacement generating means are elongated by voltage applied alternately thereon, similar roll-and-pitch motion occurs.

In the illustrated actuator, voltages may be simultaneously applied on both displacement generating means in such a manner that their displacements are reverse to each other. In other words, alternating voltages may be simultaneously applied on both the displacement generating means in such a manner that one elongates while another contracts, and vice versa. At this time, the center of the roll-and-pitch motion of the movable part 44 is defined by the position of the movable part 44 in the absence of voltage. Assuming here that the same driving voltage is used, the amplitude of the roll-and-pitch motion is about twice as large as that in the case of the alternate application of voltage. On one side of the roll-and-pitch motion in this case, however, the displacement generating means is so elongated that the direction of the driving voltage is reverse to the direction of polarization. For this reason, the polarization of the piezoelectric or electrostrictive material layer may possibly attenuate at a high applied voltage or upon the continued application of voltage. It is thus required that the driving voltage be obtained by applying a constant direct current bias voltage in the same direction as that of polarization and superposing the aforesaid alternating voltage on the bias voltage, thereby foreclosing the possibility that the direction of driving voltage may be reverse to the direction of polarization. The center of the roll-and-pitch motion in this case is defined by the position of the displacement generating means with the bias voltage alone applied thereon.

The actuator 4 has a structure in which the displacement generating means 41, and fixed and movable parts 43 and 44 are formed as an integrated single piece by holing and notching a sheet-like member of piezoelectric or electrostrictive material with electrode layers formed at given sites. It is thus possible to increase the rigidity and dimensional accuracy of the actuator, with no fear of assembly errors. In addition, since any adhesive is not used for actuator fabrication, it is highly unlikely that any adhesive layer is deposited at the position of the actuator where stresses are induced by the deformation of the displacement generating means. Stated otherwise, problems such as transmission losses due to the adhesive layer and changes-with-time of adhesion strength are absolutely unlikely to come up.

By the "piezoelectric or electrostrictive material" used herein is meant a material capable of elongating or contracting due to the inverse piezoelectric effect or electrostrictive effect. Any desired piezoelectric or electrostrictive material may be used provided that it can be applied to the displacement generating means of the actuator. By reason of high rigidity, however, it is usually preferable to use ceramic piezoelectric or electrostrictive materials such as PZT [Pb(Zr, Ti)O$_3$], PT (PbTiO$_3$), PLZT [(Pb, La)(Zr, Ti)O$_3$], and barium titanate (BaTiO$_3$). The actuator, when it is made up of ceramic piezoelectric or electrostrictive materials, may easily be fabricated using thick-film techniques such as a sheet-making or printing process. It is noted that the actuator may also be fabricated by thin-film techniques. The piezoelectric or electrostrictive material, when it has a crystalline structure, may be of either a polycrystalline structure or a monocrystalline structure.

No special limitation is imposed on how to form the electrode layers; an appropriate selection may be made from various processes such as printing, firing, sputtering, and evaporation of conductive paste while how to form the piezoelectric or electrostrictive material layer is taken into account.

An actuator may have any structure in which at least one piezoelectric or electrostrictive material layer, having electrode layers on both sides, exists at the displacement generating means. However, it is preferable to use a multi-layer structure wherein two or more such piezoelectric or electrostrictive material layers are stacked one upon another. The amount of elongation and contraction of the piezoelectric or electrostrictive material layer is proportional to electric field intensity. However, the aforesaid multilayer structure makes it possible to make the piezoelectric or electrostrictive material layer so thin that the required electric field intensity can be obtained at a low voltage, and so the driving voltage can be lowered. At the same driving voltage as that used with a single layer structure, the amount of elongation and contraction can become much larger. The thickness of the piezoelectric or electrostrictive material layer is not critical, and so may be determined depending on various conditions such as driving voltage, the required amount of elongation and contraction, and ease of fabrication. However, a thickness of about 5 µm to about 50 µm is usually preferred in the practice of the invention. Similarly, the upper limit to the number of piezoelectric or electrostrictive material layers stacked one upon another is not critical, and so may be determined in such a manner that displacement generating means having a desired thickness are obtainable. It is noted that a covering piezoelectric or electrostrictive material layer is usually provided on the outermost electrode layer.

Although not illustrated, the suspension 3 is provided on its surface with an interconnecting pattern for driving the actuator 4 and an interconnecting pattern to be connected to the electromagnetic transducer element 1 as occasion may be. The suspension 3 may also be provided on its surface with a head driving IC chip (a read/write IC). If a signal processing IC is mounted on the suspension, it is then possible to reduce the length of the interconnecting pattern from the electromagnetic transducer element to the signal processing IC, so that the signal frequency can be made high due to a decrease in inducing components.

While the present invention is suitable for cases where the actuator of the illustrated integral structure is used, it is understood that the present invention may also be used for cases where various actuators having assembly structures employing piezoelectric elements, and actuators making use of electrostatic force, and electromagnetic force are used.

The suspension 3 is generally formed of a resilient metal material such as stainless steel. For the interconnecting pattern, on the other hand, a part thereof has a general structure wherein a resin-coated conductor wire is brought in close contact with the surface of the suspension. No special limitation is imposed on how to form the interconnecting pattern having such a structure; however, it is preferable to make use of a process wherein an insulating resin film is formed on the surface of the suspension 3 and a conductor wire is formed on the resin film followed by forming another resin film thereon as a protective film, and a process wherein an interconnecting film having a multilayer structure comprising such a resin film and a conductor wire is bonded to the suspension 3.

In the magnetic head supporting mechanism having such a structure as herein mentioned, an electrical connection to the electromagnetic transducer element is made by a first interconnecting arrangement capable of moving and/or deforming in the displacement direction of the slider by the actuator, and an electrical connection to the actuator is made by a second interconnecting arrangement.

Then, exemplary constructions of the first and second interconnecting arrangements are explained.

Figure 1A:
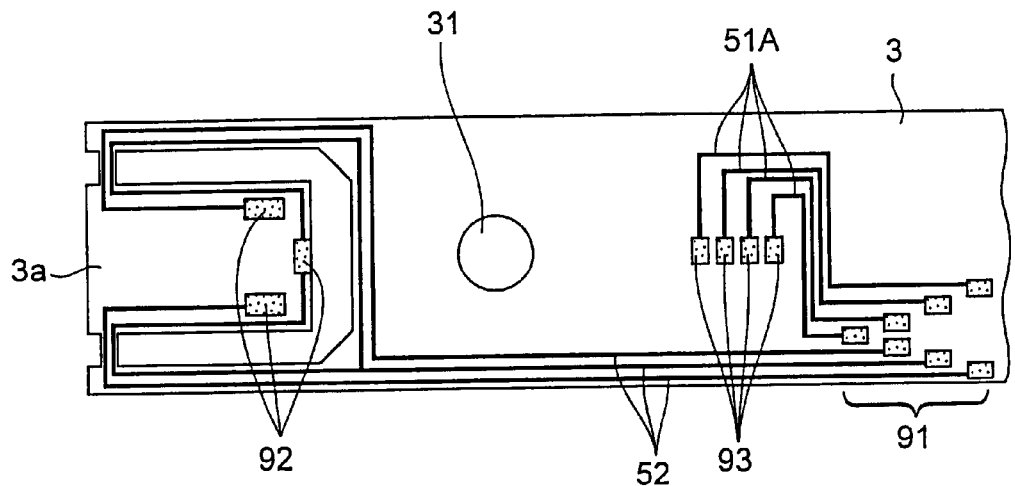
FIG. 1A is a plan view of the surface of the suspension opposite to a medium in the magnetic head according to the first aspect of the invention.
Figure 1B:
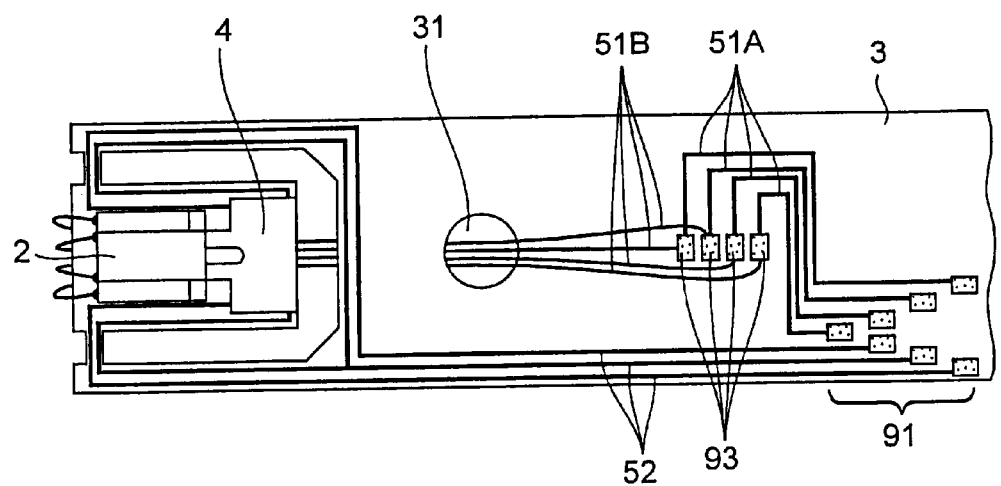
FIG. 1B is a plan view of the suspension shown in FIG. 1A, on which the slider is mounted with the actuator located between them.
Figure 1C:
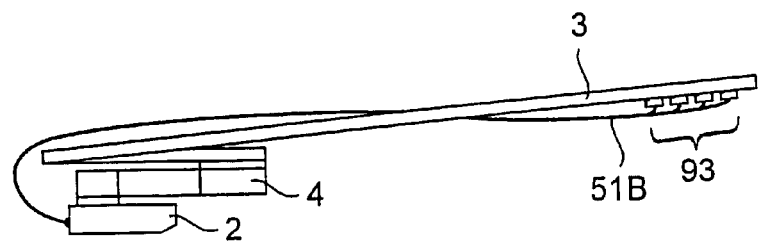
FIG. 1C is a side view of FIG. 1B.

One exemplary embodiment of the first aspect of the invention is illustrated in FIGS. 1A, 1B and 1C. FIG. 1A is a plan view of the suspension 3 with the actuator and slider removed therefrom, as viewed from the side of the suspension 3 opposite to a medium. FIG. 1B is a plan view of the FIG. 1A suspension 3 on which the slider 2 is mounted with the actuator 4 located between them. FIG. 1C is a side view of the embodiment as shown in FIG. 1B.

Referring to FIG. 1A, a second interconnecting arrangement 52 having three conductor wires for driving the actuator is provided in close contact with the surface of the suspension 3 opposite to a medium, and connected on its base end side to a terminal electrode group 91 provided on the surface of the suspension 3 opposite to the medium and on its leading end side to a terminal electrode group 92 provided at a gimbal block 3a. It is here noted that each of terminal electrodes in the terminal electrode group 91 is connected with a wire (not shown) to be connected to an actuator driving circuit and/or a write/read circuit.

In the first interconnecting arrangement having four conductor wires to be connected to the electromagnetic transducer element, close-contact wires 51A in close contact with the surface of the suspension 3 opposite to the medium are connected to lead wires 51B floating away from the suspension 3 at least in the vicinity of a junction with the electromagnetic transducer element by way of a terminal electrode group 93, as shown in FIG. 1B. On the base end side of the first interconnecting arrangement the close-contact wires 51A are connected to the above terminal electrode group 91, and on the leading end side the lead wires 51B pass through a through-hole 31 formed in the suspension 3 to the back surface of the suspension 3, whence they are turned back around the leading end of the suspension 3, terminating at connections to the terminal electrode group in the electromagnetic transducer element provided on the slider 2.

In the first aspect of the invention shown in FIGS. 1A, 1B and 1C, the connection to the electromagnetic transducer element provided on the slider 2 is made by the lead wires 51B. These lead wires 51B are capable of moving and/or deforming in the displacement direction of the slider 2 by the actuator 4, and so provide no impediment to the displacement capability of the actuator 4.

Figure 2:
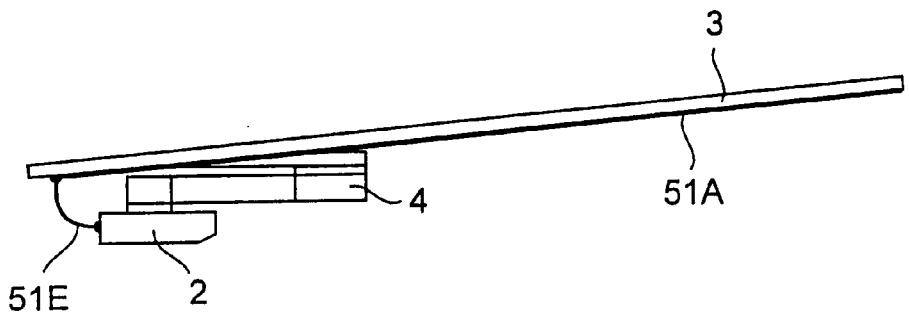
FIG. 2 is a side view of one exemplary construction of the magnetic head according to the first aspect of the invention.
Figure 3:
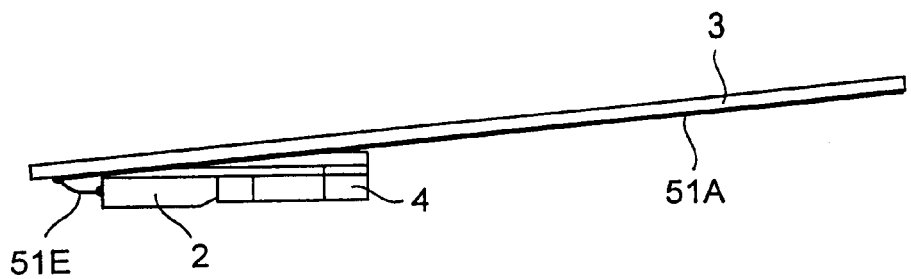
FIG. 3 is a side view of another exemplary construction of the magnetic head according to the first aspect of the invention.

In the practice of the invention, bonding wires may be used as the lead wires floating away from the surface of the suspension. FIGS. 2 and 3 are side views of exemplary bonding wire arrangements.

As shown in FIGS. 2 and 3, a close-contact wire 51A extending to an extreme end portion of the suspension 3 is provided at its extreme end with a terminal electrode group, which is in turn connected to a terminal electrode group in the electromagnetic transducer element provided on the slider 2 by way of a bonding wire 51E. The bonding wire 51E has an extra length as shown, so that it can move and/or deform in the displacement direction of the slider 2. In this embodiment, too, the first interconnecting arrangement provides no impediment to the displacement capability of the actuator 4.

The bonding wire 51E is formed by a wire bonding process. The use of an automatic bonder enables an interconnecting step to be so automated that productivity can be improved, resulting in cost reductions. For wire bonding, use may be made of ordinarily employed thermocompression bonding processes, ultrasonic bonding processes, and thermo-sonic bonding processes with application of ultrasonic waves during thermocompression. No particular limitation is imposed on the material of bonding wires; an appropriate selection may be made from ordinarily employed Au, Al, Cu, etc. However, Au is particularly preferred because of its satisfactory corrosion resistance. Although depending on what material is used for the bonding wire, the diameter thereof may be determined such that sufficient electrical conduction and mechanical strength are achievable together with flexibility enough to provide no impediment to the displacement of the slider 2. However, the bonding wire should preferably have a diameter of 20 to 50 μm. Too fine a bonding wire makes conductivity and mechanical strength likely to become insufficient, whereas too thick a bonding wire may impair the displacement of the slider 2 due to its too high rigidity.

In FIG. 2, the actuator 4 is located on the back surface side of the slider 2, i.e., the surface of the slider 2 opposite to the suspension 3, as in FIG. 1C. In FIG. 3, on the other hand, the actuator 4 is located on one side of slider 2 so as to keep the height of the whole low. In all arrangements included herein, to say nothing of the interconnecting arrangement using bonding wires, the slider should preferably be located relative to the actuator as shown in FIG. 2 or FIG. 3.

Figure 4:
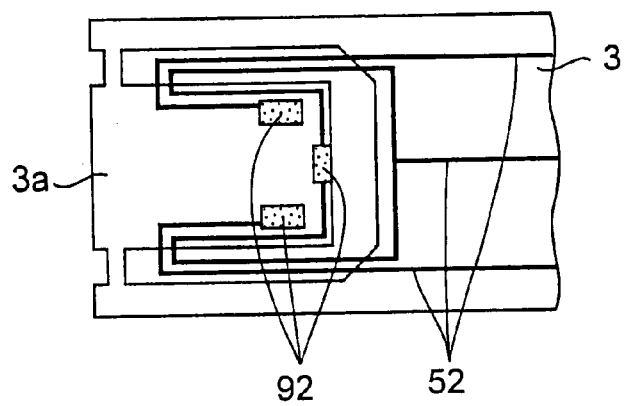
FIG. 4 is a plan view of the surface of the suspension opposite to the medium.

In the embodiment as just mentioned above, the second interconnecting arrangement that is not needed to move or deform in association with the driving of the actuator is formed in close contact with the surface of the suspension. This structure is preferable because adjustment of the second interconnecting arrangement is hardly needed, and the step of forming the second interconnecting arrangement can be simplified. In the practice of the invention, however, it is acceptable to float at least a part of the second interconnecting arrangement 52 away from the suspension 3, as shown in FIG. 4 for instance.

Figure 5A:
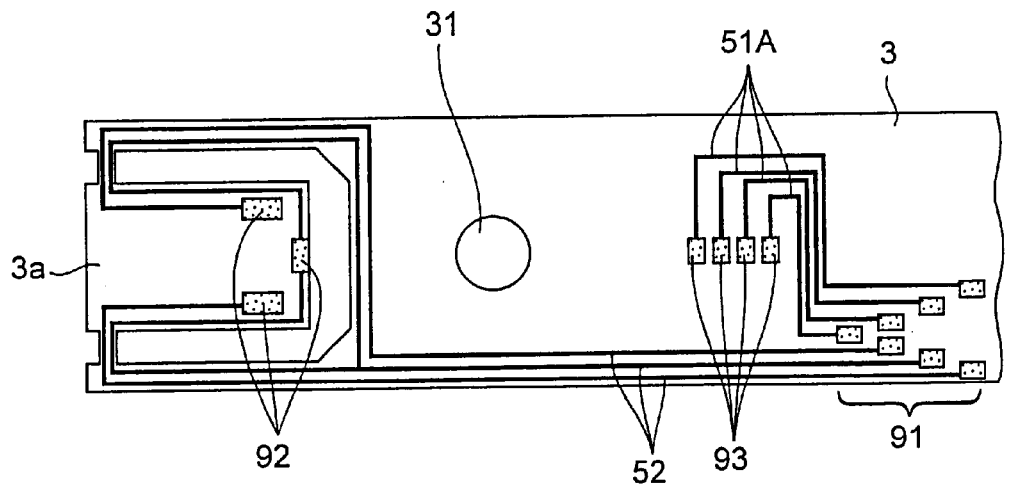
FIG. 5A is a plan view of the surface of the suspension opposite to a medium in the magnetic head according to the second aspect of the invention.
Figure 5B:
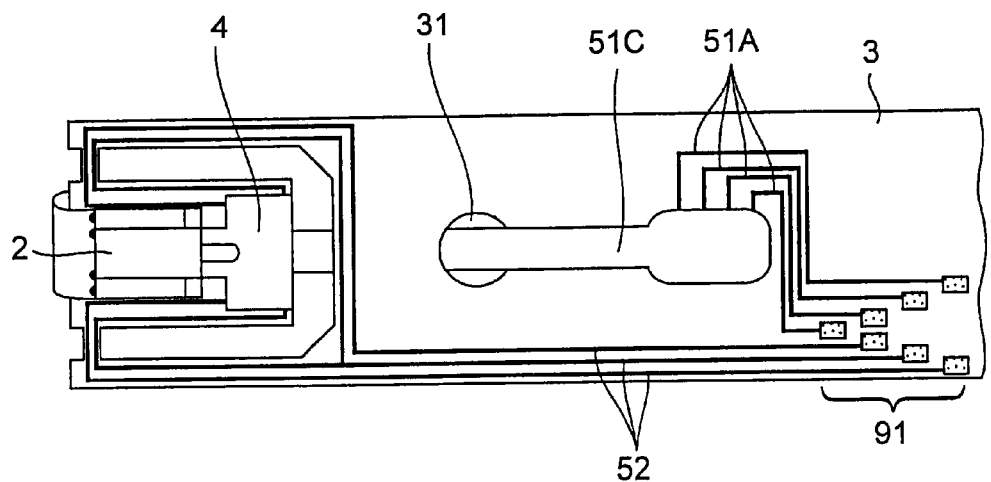
FIG. 5B is a plan view of the suspension shown in FIG. 5A, on which the slider is mounted with the actuator located between them.
Figure 5C:
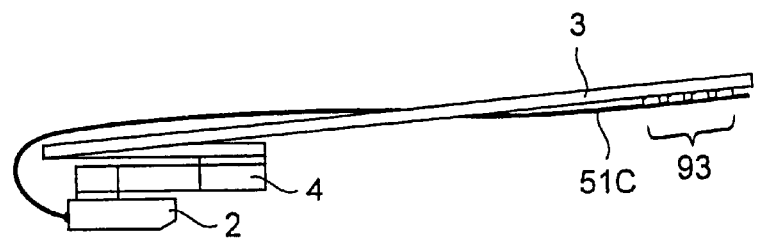
FIG. 5C is a side view of FIG. 5B.

One exemplary embodiment of the second aspect of the invention is shown in FIGS. 5A, 5B and 5C. FIG. 5A is a plan view of the suspension 3 with the actuator and slider removed therefrom, as viewed from the side of the suspension 3 opposite to a medium. FIG. 5B is a plan view of the FIG. 5A suspension 3 on which the slider 2 is mounted with the actuator 4 located between them. FIG. 5C is a side view of the embodiment as shown in FIG. 5B.

This embodiment according to the second aspect of the invention is the same as the embodiment according to the first aspect with the exception that flexible printed satires 51C are used for the lead wires 51B shown in FIG. 1B. The flexible printed wires 51C used in this embodiment is capable of moving and/or deforming in the displacement direction of the slider 2; in this embodiment, too, the first interconnecting arrangement provides no impediment to the displacement capability of the actuator 4.

Figure 6A:
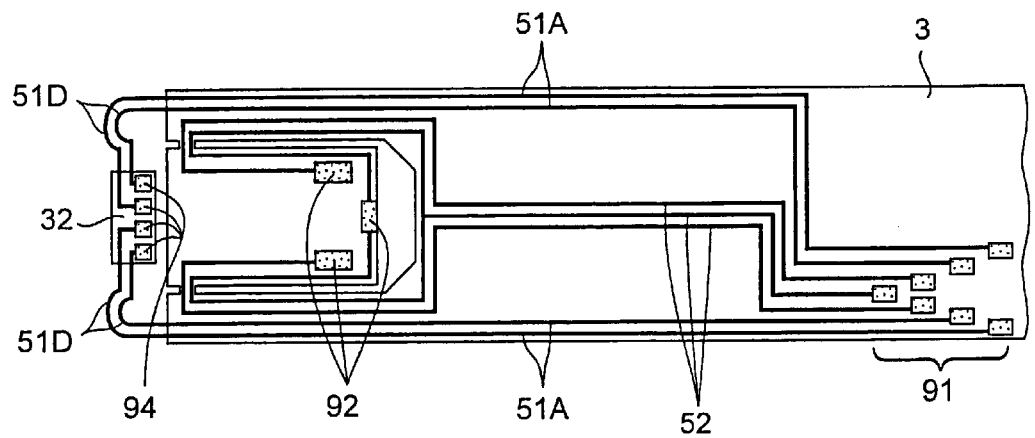
FIG. 6A is a plan view of the surface of the suspension opposite to a medium in the magnetic head according to the third aspect of the invention.
Figure 6B:
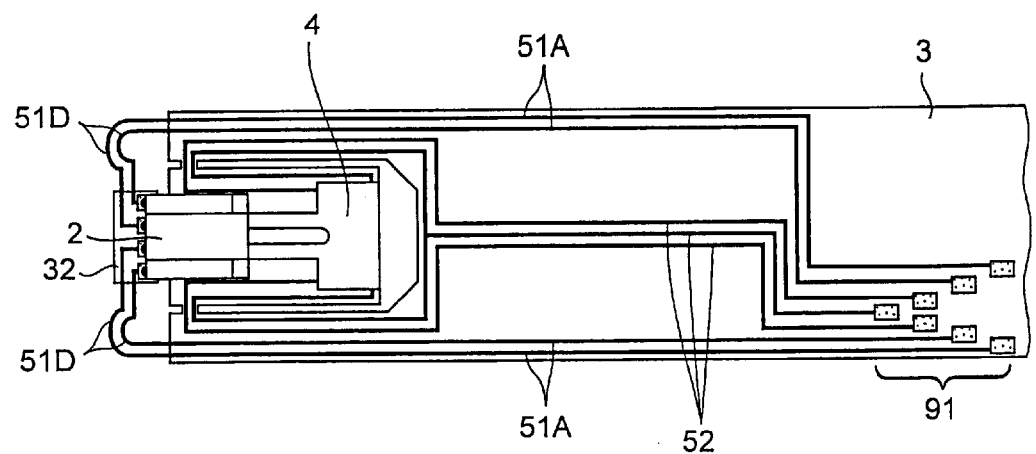
FIG. 6B is a plan view of the suspension shown in FIG. 6A, on which the slider is mounted with the actuator located between them.
Figure 6C:
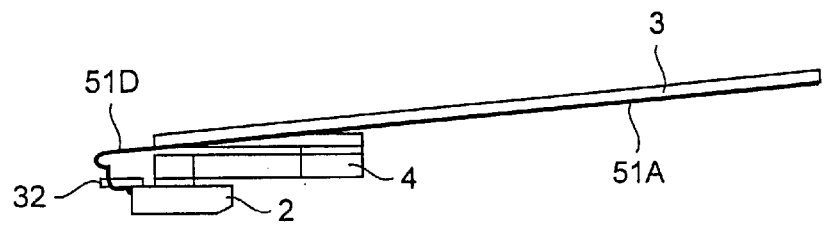
FIG. 6C is a side view of FIG. 6B.

One exemplary embodiment of the third aspect of the invention is shown in FIGS. 6A, 6B and 6C. FIG. 6A is a plan view of the suspension 3 with the actuator and slider removed therefrom, as viewed from the side of the suspension 3 opposite to a medium. FIG. 6B is a plan view of the FIG. 6A suspension 3 on which the slider 2 is mounted with the actuator 4 located between them. FIG. 6C is a side view of the embodiment as shown in FIG. 6B.

As shown in FIG. 6A, the second interconnecting arrangement 52 in the third aspect of the invention has a close-contact structure as in the rest of the invention.

The first interconnecting arrangement shown in FIG. 6A comprises close-contact wires 51A in close contact with the suspension 3 and floating wires 51D floating away from the suspension 3. This first interconnecting arrangement is formed by forming close-contact wires on the surface of the suspension 3 opposite to a medium, and then removing a leading end portion of the suspension 3, thereby placing a part of the close-contact wires in a floating state. In the illustrated embodiment, the close-contact wires having a terminal electrode group 94 comprising four terminal electrodes is previously formed on the leading end portion of the suspension 3. Then, the leading end portion of the suspension 3 is removed to leave the area where the terminal electrode group 94 exists in the form of a terminal electrode sheet 32. Subsequently, the floating wires 51D are bent or curved to connect the terminal electrode group 94 to a terminal electrode group on the slider 2, as shown in FIGS. 6B and 6C. In the practice of the invention, however, it is not an essential requirement to form the terminal electrode sheet 32; that is, the first interconnecting arrangement may be connected directly to the terminal electrode group on the slider 2. Removal of a part of the suspension 3, for instance, may be achieved by wet etching.

In the third aspect of the invention, a portion of the firstly formed close-contact wires which provides at least the floating wires 51D should preferably be curved or bent as shown. This allows the floating wires 51D to move and/or deform easily in the displacement direction of the slider 2 by the actuator 4, so that in the third aspect of the invention, too, the first interconnecting arrangement provides no impediment to the displacement capability of the actuator 4.

Figure 7:
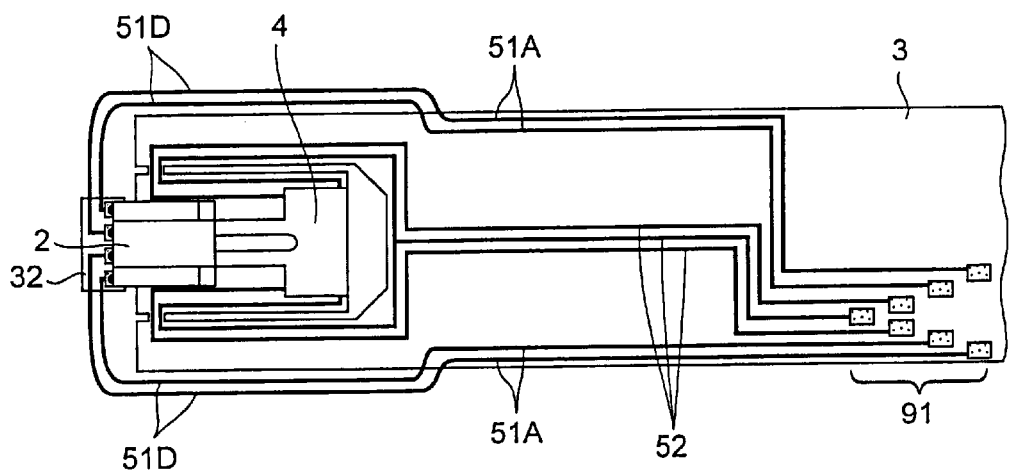
FIG. 7 is a plan view of the magnetic head according to the third aspect of the invention, wherein the slider is mounted on the suspension with the actuator located between them.

One modification of the third aspect of the invention is shown in FIG. 7. This modification is different from the embodiment shown in FIG. 6B in that at a position near to the leading end of the suspension, close-contact wires 51A in a first interconnecting arrangement are changed to floating wires 51D. Thus, the floating wires 51D are more easily movable and deformable than those in FIG. 6B. The structure shown in FIG. 7 may be formed in the same manner as that shown in FIG. 6B.

The third aspect of the invention is suitable for fabrication process automation because the number of steps can be smaller than that in FIG. 1B, and FIG. 5B. In addition, any control is hardly needed because a substantial portion of the first interconnecting arrangement comprises close-contact wires, resulting in stability improvements.

Figure 8:
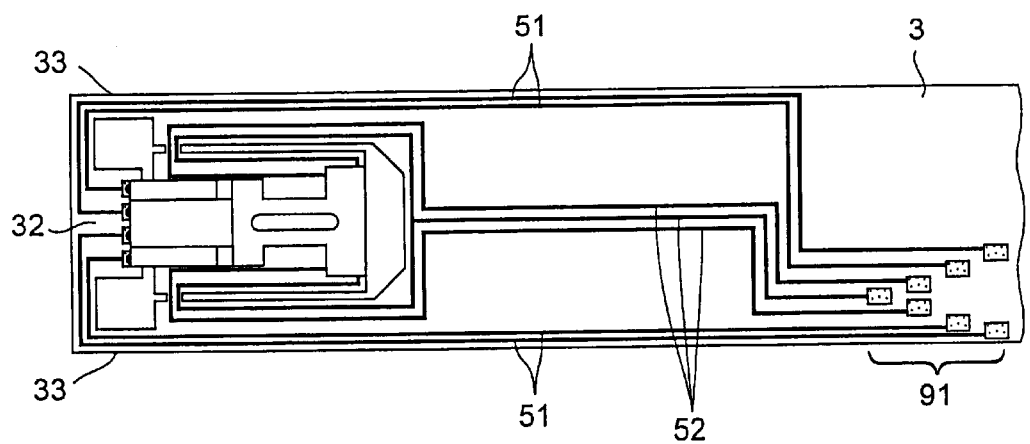
FIG. 8 is a plan view of the magnetic head according to the fourth aspect of the invention, wherein the slider is mounted on the suspension with the actuator located between them.

In a magnetic head embodiment according to the fourth aspect of the invention, a first interconnecting arrangement is provided in close contact with the surface of the suspension 3 and a part of the suspension 3 is provided with an area of low rigidity, as shown in FIG. 8, so that this area and the first interconnecting arrangement 51 in close contact with the surface thereof are movable and/or deformable in the displacement direction of a slider 2. In FIG. 8, the area of low rigidity is defined by a narrow low-rigidity area 33 provided at a leading end portion of the suspension 3. The shape, width and length of the low-rigidity area may be determined such that the displacement of a slider 2 is not impaired, while the amount of displacement, displacement frequency, etc. are taken into consideration.

The magnetic head according to the fourth aspect of the invention may be fabricated by a process similar to that for the magnetic head according to the third aspect of the invention. Referring back to FIG. 6A illustrative of the third aspect of the invention, the terminal electrode sheet 32 is completely separate from the suspension 3. When the magnetic head according to the fourth aspect is fabricated, however, it is acceptable to bring the terminal electrode sheet 32 in partial contact with the suspension 3, thereby allowing the first interconnecting arrangement to come in close contact with that area of partial contact. In other words, if a narrow area is left by providing a through-hole through the leading end portion of the suspension 3 by means of etching or punching, optionally with the etching-out or punching-out of the outer edge of the leading end portion of the suspension, this area can then provide the low-rigidity area 33. In this regard, it is also acceptable to shape the suspension 3 upon provided with close-contact wires or form close-contact wires on the pre-shaped suspension 3.

In FIG. 8, the actuator 4 is located on one side of the slider 2. However, the fourth aspect of the invention may also be applied to a structure where the actuator 4 is located on the back surface side of the slider 2. In this case, it is required that the leading end portion of the suspension is curved or bent over the actuator toward the slider and a part of the aforesaid leading end portion be of rigidity low enough to be movable and/or deformable in the displacement direction of the slider by the actuator. Stated otherwise, the leading end portion of the suspension should preferably be curved or bent such that the terminal electrode sheet goes over the actuator 4 and reach the slider 2 as is the case with the terminal electrode sheet 32 shown in FIG. 6C.

In the fourth aspect of the invention, too, the terminal electrode sheet 32 is not an essential requirement as in the third aspect of the invention. Further, the fourth aspect of the invention is suitable for fabrication process automation because the number of steps can be reduced as in the third aspect of the invention. Furthermore, any control is hardly needed because a substantial portion of the first interconnecting arrangement comprises close-contact wires, resulting in stability improvements.

In the practice of the invention, it is preferable that at least a part of the first interconnecting arrangement and at least a part of the second interconnecting arrangement do not exist on the same surface of the suspension, as typically shown in FIG. 1B and FIG. 5B, respectively. This makes it possible to reduce interferences between head signals and actuator driving signals.

In the first and second aspects of the invention, the close-contact wires 51A may be formed on the surface of the suspension 3 which faces away from the medium while the suspension 3 is not provided with the through-hole 31. In the third aspect of the invention, the close-contact wires 51A may be formed on the surface of the suspension 3 facing away from the medium, so that the floating wires 51D can go over the leading end of the suspension 3.

Figure 9A:
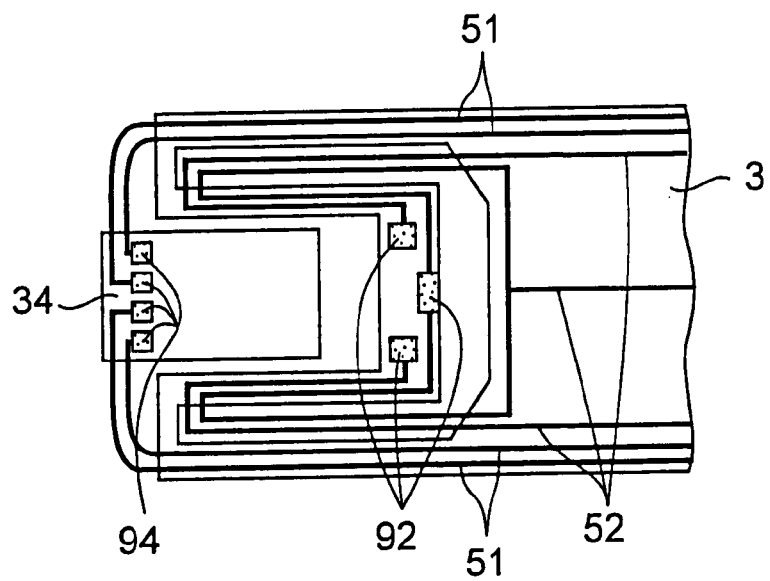
FIG. 9A is a plan view of the surface of the suspension opposite to a medium in the magnetic head according to the third aspect of the invention.
Figure 9B:
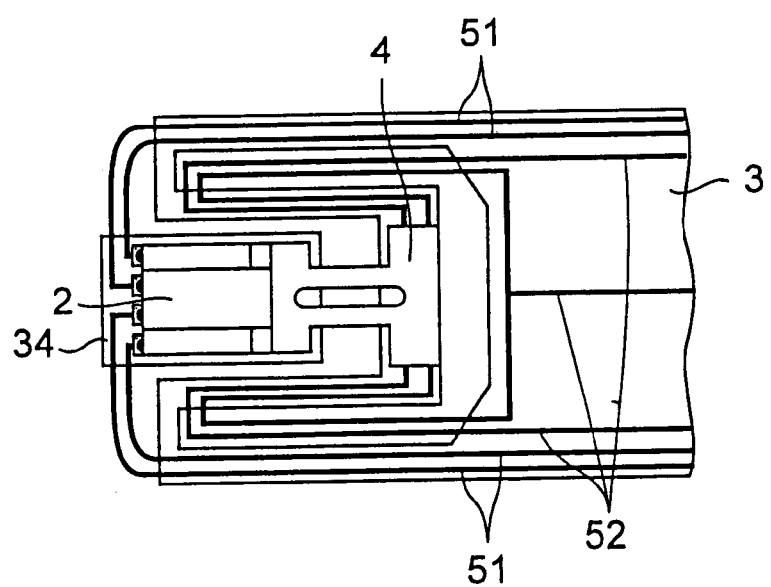
FIG. 9B is a plan view of the suspension shown in FIG. 9A, on which the slider is mounted with the actuator located between them.

When the actuator 4 is located on the side of the slider 2, it is acceptable to bond together the sides of both. However, adhesion strength may often become insufficient due to a relatively small bonding area. In this case, it is thus preferable to use a backup member capable of bonding at a large area to both the slider 2 and the actuator 4. Illustrated in FIG. 9A is one embodiment of the magnetic head of the third aspect of the invention, wherein such a backup member is provided. In FIG. 9A, a backup sheet 34 functions as the aforesaid backup member. This backup sheet 34 is of size enough to bond to both the back surface of the slider 2 and the back surface of the movable part in the actuator 4. As shown in FIG. 9B, the backup sheet is bonded to and astride both the back surfaces. The illustrated backup sheet 34 has a terminal electrode group 94 as is the case with the terminal electrode sheet 32 shown in FIG. 6A, and may be formed by processing the suspension 3 as is the case with the terminal electrode sheet 32.

In this regard, it is not an essential requirement to provide the backup sheet 34 with the terminal electrode group 94; that is, the backup sheet 34 may be designed to function only as a backup member. While the illustrated backup sheet 34 is a member independent of the suspension 3, it is understood that the backup sheet may be constructed as a part of the suspension 3 as is the case with the terminal electrode sheet 32 shown in FIG. 8. Thus, the backup sheet may be used not only in the third aspect of the invention but also in the first, second and fourth aspects of the invention.

While explanation has been made with reference to the HDD magnetic head out of write/read heads, it is understood that the present invention may also be applied to an optical disk system. A conventional optical disk system makes use of an optical pickup comprising an optical module including at least a lens. This optical pickup is so designed that the lens can be mechanically controlled so as to be focused on the recording surface of the optical disk. In recent years, near field recording has been proposed to achieve ever-higher optical disk recording densities. In this regard, see "NIKKEI ELECTRONICS", 1997.6.16 (No. 691), page 99. This near field recording makes use of a flying head which uses a slider like a slider used with a flying type magnetic head. Built in this slider is an optical module comprising a hemispherical lens called a solid immersion lens or SIL, a magnetic field modulation recording coil, and a prefocusing lens. Another flying head for near field recording is disclosed in U.S. Pat. No. 5,497,359. With higher recording densities, such a flying head, too, is increasingly required to have higher tracking precision as in the case of a HDD magnetic head. Thus, the micro-displacement actuator is also effective for the flying head. Accordingly, the present invention may also be applied to such a write/read head (optical head) for optical recording media.

More generally, the optical head to which the present invention can be applied comprises a slider similar to that in the aforesaid magnetic head, with an optical module built therein, or a slider which is in itself constructed of an optical module. The optical module comprises at least a lens, if required, with a lens actuator and a magnetic field generating coil incorporated therein. Such an optical head, for instance, includes not only a flying head for near field recording such as one mentioned just above but also an optical head wherein a slider is slidable on the surface of a recording medium, i.e., a pseudo-contact type or contact type optical head. To have an easy understanding of the case where the present invention is applied to the optical head, the electromagnetic transducer element in the foregoing explanation should be read as an optical head. It is understood that the present invention may be applied to a pseudo-contact type or contact type magnetic head as well.

Conceptually, the term "write/read head" used herein shall include a write/read head, a write-only head, and a read-only head. Likewise, the term "write/read system" used herein shall include a write/read system, a write-only system, and a read-only system. The term "recording medium" used herein, too, shall include a read-only type medium such as a read-only optical disk in addition to a recordable medium.

To ascertain the advantages of the invention, the following experimentation was carried out.

Experimental Example 1

A magnetic head of such construction as shown in FIGS. 1A, 1B and 1C was prepared. Polyimide-coated conductor wires were used as the close-contact wires 51A, and conductor wires having an outer diameter of 40 $\mu$m were used for the lead wires 51B. The same wires as the close-contact wires 51A were used for the first interconnecting arrangement 52.

The actuator used was set out using PZT (piezoelectric constant $d_{31}=-200\times10^{-12}$ m/V) as a piezoelectric or electrostrictive material. When 10 V (DC bias voltage) ±10 V was applied on both displacement generating means in such a manner that the phases of sine wave driving voltage were mutually inverted, the movable parts showed a displacement amount of about ±0.5 $\mu$m.

Using this magnetic head, the actuator was driven under a head load of 2.5 g. Consequently, the amount of displacement of the electromagnetic transducer element provided on the slider 2 was about ±0.5 $\mu$m, indicating that the displacement capability of the actuator is not impaired.

Experimental Example 2

A magnetic head having such construction as shown in FIG. 2 was prepared. The close-contact wires 51A and the second interconnecting arrangement were formed as in Experimental Example 1. Au wires having a diameter of 25 $\mu$m were used for the bonding wires 51E. The actuator and slider used were the same as in Experimental Example 1.

This magnetic head was driven as in Experimental Example 1. Consequently, it was ascertained that the displacement capability of the actuator is not impaired.

Experimental Example 3

A magnetic head having such construction as shown in FIG. 7 was prepared. The second interconnecting arrangement 52 was formed as in Experimental Example 1. The first interconnecting arrangement was formed in the following manner. First, close-contact wires were formed on the surface of the suspension. In this state, a part of the suspension was then wet etched out, thereby floating a part of the close-contact wires away from the suspension 3. In this manner, the first interconnecting arrangement comprising close-contact wires 51A and floating wires 51D was obtained.

This magnetic head was driven as in Experimental Example 1. Consequently, it was ascertained that the displacement capability of the actuator is not impaired.

ADVANTAGES OF THE INVENTION

In the write/read head supporting mechanism of the invention, the displacement capability of the actuator is not impaired because the suspension side is connected to the electromagnetic transducer element by way of the interconnecting arrangement movable and/or deformable in the displacement direction of the slider by the actuator.

Japanese Patent Application Nos. 10-341131 and 11-200358 are herein incorporated by reference.

The structures illustrated and described herein illustrate the principles of the invention. Modifications to the illustrated embodiments may be made without departing from the spirit and scope of the invention. Therefore the present invention includes the subject matter defined by the appended claims and all reasonable equivalents.

What we claim is:

1. A write/read head supporting mechanism, comprising:
   a slider provided with an electromagnetic transducer element or an optical module;
   a suspension, said slider being supported on said suspension by a microactuator for displacing said slider;
   a first interconnecting arrangement movable and/or deformable in a displacement direction of said slider by said microactuator for making an electrical connection to said electromagnetic transducer element or said optical module; and
   a second interconnecting arrangement for making an electrical connection to said microactuator,
   wherein the microactuator is interposed between the suspension and the slider.

2. The write/read head supporting mechanism according to claim 1, wherein said first interconnecting arrangement includes a lead wire floating away from a surface of said suspension.

3. The write/read head supporting mechanism according to claim 2, wherein said lead wire floating away form the surface of said suspension is a bonding wire.

4. The write/read head supporting mechanism according to claim 1, wherein said first interconnecting arrangement includes a flexible printed wire.

5. The write/read head supporting mechanism according to claim 1, wherein said first interconnecting arrangement is formed by forming said arrangement on a surface of said suspension, and then removing a part of said suspension so that a part of said arrangement is placed in a floating state.

6. The write/read head supporting mechanism according to claim 1, wherein said first interconnecting arrangement is formed on a surface of said suspension, and allowing an area of low rigidity to exist at a part of said suspension, so that said first interconnecting arrangement is movable and/or deformable in the displacement direction of said slider by said microactuator.

7. The write/read head supporting mechanism according to claim 1, wherein at least one part of said first interconnecting arrangement and at least one part of said second interconnecting arrangement do not exist on the same surface of said suspension.

8. The write/read head supporting mechanism according to claim 1, wherein said microactuator uses an inverse piezoelectric effect or an electrostrictive effect.

9. The write/read head supporting mechanism according to claim 1, further comprising a head driving IC chip built on said suspension.

10. The write/read head supporting mechanism according to claim 1, further comprising a main actuator for driving said suspension.

11. A write/read system comprising:
a write/read head supporting mechanism including,
   a slider provided with an electromagnetic transducer element or an optical module;
   a suspension, said slider being supported on said suspension by a microactuator for displacing said slider;
   a first interconnecting arrangement movable and/or deformable in a displacement direction of said slider by said microactuator for making an electrical connection to said electromagnetic transducer element or said optical module; and
   a second interconnecting arrangement for making an electrical connection to said microactuator,
wherein the microactuator is interposed between the suspension and the slider.

12. The write/read head supporting mechanism according to claim 7, wherein said first interconnecting arrangement includes wires that are in close contact with a surface of said suspension, and pass through a through-hole formed in said suspension so that a part of said wires in close contact with the surface of said suspension is placed in a floating state.

13. A write/read head supporting mechanism, comprising:
a slider provided with an electromagnetic transducer element or an optical module;
a suspension, said slider being supported on said suspension by a microactuator for displacing said slider;
a first interconnecting arrangement movable and/or deformable in a displacement direction of said slider by said microactuator for making an electrical connection to said electromagnetic transducer element or said optical module; and
a second interconnecting arrangement for making an electrical connection to said microactuator,
wherein the microactuator is disposed at one side of the slider, and the microactuator and slider are disposed below the suspension.

14. A write/read system comprising:
a write/read head supporting mechanism including,
   a slider provided with an electromagnetic transducer element or an optical module;
   a suspension, said slider being supported on said suspension by a microactuator for displacing said slider;
   a first interconnecting arrangement movable and/or deformable in a displacement direction of said slider by said microactuator for making an electrical connection to said electromagnetic transducer element or said optical module; and
   a second interconnecting arrangement for making an electrical connection to said microactuator,
wherein the microactuator is disposed at one side of the slider, and the microactuator and slider are disposed below the suspension.

* * * * *